US010162755B2

(12) United States Patent
Guthrie et al.

(10) Patent No.: US 10,162,755 B2
(45) Date of Patent: *Dec. 25, 2018

(54) TECHNIQUES FOR IMPLEMENTING BARRIERS TO EFFICIENTLY SUPPORT CUMULATIVITY IN A WEAKLY-ORDERED MEMORY SYSTEM

(71) Applicant: INTERNATIONAL BUSINESS MACHINES CORPORATION, Armonk, NY (US)

(72) Inventors: Guy L. Guthrie, Austin, TX (US); Hugh Shen, Round Rock, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,191

(22) Filed: Oct. 31, 2016

(65) Prior Publication Data

US 2017/0046264 A1 Feb. 16, 2017

Related U.S. Application Data

(63) Continuation of application No. 14/245,156, filed on Apr. 4, 2014, now Pat. No. 9,514,045.

(51) Int. Cl.
*G06F 9/312* (2018.01)
*G06F 9/52* (2006.01)
*G06F 12/0811* (2016.01)
*G06F 12/128* (2016.01)
*G06F 9/38* (2018.01)
(Continued)

(52) U.S. Cl.
CPC ........ *G06F 12/0811* (2013.01); *G06F 9/3838* (2013.01); *G06F 12/0815* (2013.01); *G06F 12/0842* (2013.01); *G06F 12/0897* (2013.01); *G06F 12/128* (2013.01); *G06F 9/30043* (2013.01); *G06F 9/30087* (2013.01); *G06F 9/3836* (2013.01); *G06F 9/522* (2013.01); *G06F 2212/284* (2013.01); *G06F 2212/6042* (2013.01)

(58) Field of Classification Search
CPC ............... G06F 12/128; G06F 12/0811; G06F 12/0815; G06F 12/0842; G06F 9/30043; G06F 9/30087; G06F 9/3836; G06F 9/3838; G06F 9/522; G06F 2212/284; G06F 2212/69; G06F 12/0897; G06F 2212/6042
USPC .......................... 712/216–219, 228; 711/155
See application file for complete search history.

(56) References Cited

U.S. PATENT DOCUMENTS 5,665,506 A  9/1997 Hesson
5,666,506 A *  9/1997 Hesson ................... G06F 9/383
711/E12.02

(Continued)

*Primary Examiner* — Daniel H Pan
(74) *Attorney, Agent, or Firm* — Yudell Isidore PLLC

(57) ABSTRACT

A technique for operating a cache memory of a data processing system includes creating respective pollution vectors to track which of multiple concurrent threads executed by an associated processor core are currently polluted by a store operation resident in the cache memory. Dependencies in a dependency data structure of a store queue of the cache memory are set based on the pollution vectors to reduce unnecessary ordering effects. Store operations are dispatched from the store queue in accordance with the dependencies indicated by the dependency data structure.

14 Claims, 12 Drawing Sheets

(51) Int. Cl.
*G06F 12/0842* (2016.01)
*G06F 12/0815* (2016.01)
*G06F 12/0897* (2016.01)
G06F 9/30 (2018.01)

(56) References Cited

U.S. PATENT DOCUMENTS

| | | |
|---|---|---|
| 6,065,086 A | 5/2000 | Arimilli et al. |
| 6,175,930 B1 | 1/2001 | Arimilli et al. |
| 6,606,702 B1 | 8/2003 | Guthrie et al. |
| 6,609,192 B1 | 8/2003 | Guthrie et al. |
| 6,625,660 B1 | 9/2003 | Guthrie et al. |
| 6,691,220 B1 | 2/2004 | Guthrie et al. |
| 6,725,340 B1 | 4/2004 | Guthrie et al. |
| 6,728,873 B1 | 4/2004 | Guthrie et al. |
| 6,748,518 B1 | 6/2004 | Guthrie et al. |
| 6,880,073 B2* | 4/2005 | Arimilli ............ G06F 9/30087 712/235 |
| 6,963,967 B1 | 11/2005 | Guthrie et al. |
| 7,284,102 B2 | 10/2007 | Guthrie et al. |
| 9,514,045 B2* | 12/2016 | Guthrie ............ G06F 12/0811 |
| 9,563,558 B2* | 2/2017 | Guthrie ............ G06F 12/0811 |
| 2009/0044194 A1* | 2/2009 | Rathi .................. G06F 9/526 718/104 |
| 2012/0210072 A1* | 8/2012 | Guthrie ............ G06F 12/0895 711/141 |

\* cited by examiner

US 10,162,755 B2

TECHNIQUES FOR IMPLEMENTING BARRIERS TO EFFICIENTLY SUPPORT CUMULATIVITY IN A WEAKLY-ORDERED MEMORY SYSTEM

RELATED APPLICATION

The present application is a continuation of and claims priority from U.S. patent application Ser. No. 14/245,156, filed on Apr. 4, 2014, titled "Techniques for Implementing Barriers to Efficiently Support Cumulatively in a Weakly-Ordered Memory System," which is incorporated by reference herein in its entirety and for all purposes.

BACKGROUND

The disclosure is generally directed to a data processing system having a weakly-ordered memory system and, more particularly, to techniques for implementing barriers to efficiently support cumulativity in a data processing system having a weakly-ordered memory system.

In computing, a memory model describes the interactions of threads through memory and how threads share data. Memory barriers are widely utilized in data processing systems that are configured to perform out-of-order program execution, which refers to reordering of memory operations (i.e., load and store operations) for execution. A barrier instruction (barrier) can, for example, cause all load instructions (loads) and store instructions (stores) prior to the barrier to be committed prior to any loads and stores issued following the barrier. Some architectures provide separate acquire and release barriers that address the visibility of read-after-write operations from the point of view of a reader or writer, respectively. Still other architectures provide separate barriers to control ordering between different combinations of operations targeting system memory and input/output (I/O) memory.

BRIEF SUMMARY

A technique of operating a cache memory of a data processing system includes creating respective pollution vectors to track which of multiple concurrent threads executed by an associated processor core are currently polluted by a store operation resident in the cache memory. Dependencies in a dependency data structure of a store queue of the cache memory are set based on the pollution vectors to reduce unnecessary ordering effects. Store operations are dispatched from the store queue in accordance with the dependencies indicated by the dependency data structure.

The above summary contains simplifications, generalizations and omissions of detail and is not intended as a comprehensive description of the claimed subject matter but, rather, is intended to provide a brief overview of some of the functionality associated therewith. Other systems, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a cache and a data processing system that implement barriers to efficiently support cumulativity in a weakly-ordered memory system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements. As may be used herein, the term 'system memory' is synonymous with the term 'main memory' and does not include 'cache' or 'cache memory'.

Modern processors typically include storage hierarchies (i.e., caches) integrated into a single integrated circuit. For example, modern processors may include one or more processor cores that include level 1 (L1) instruction and/or data caches and level 2 (L2) instruction and/or data caches coupled to a shared interconnect bus. In order to increase efficiency, processor chips are often designed with a store queue (STQ) that is typically located in an L2 cache and receives stores from a write-through L1 cache for coalescing and processing into the L2 cache. A STQ typically includes byte-addressable storage for a number of cache lines (e.g., 8 to 16 cache lines).

Figure 1:
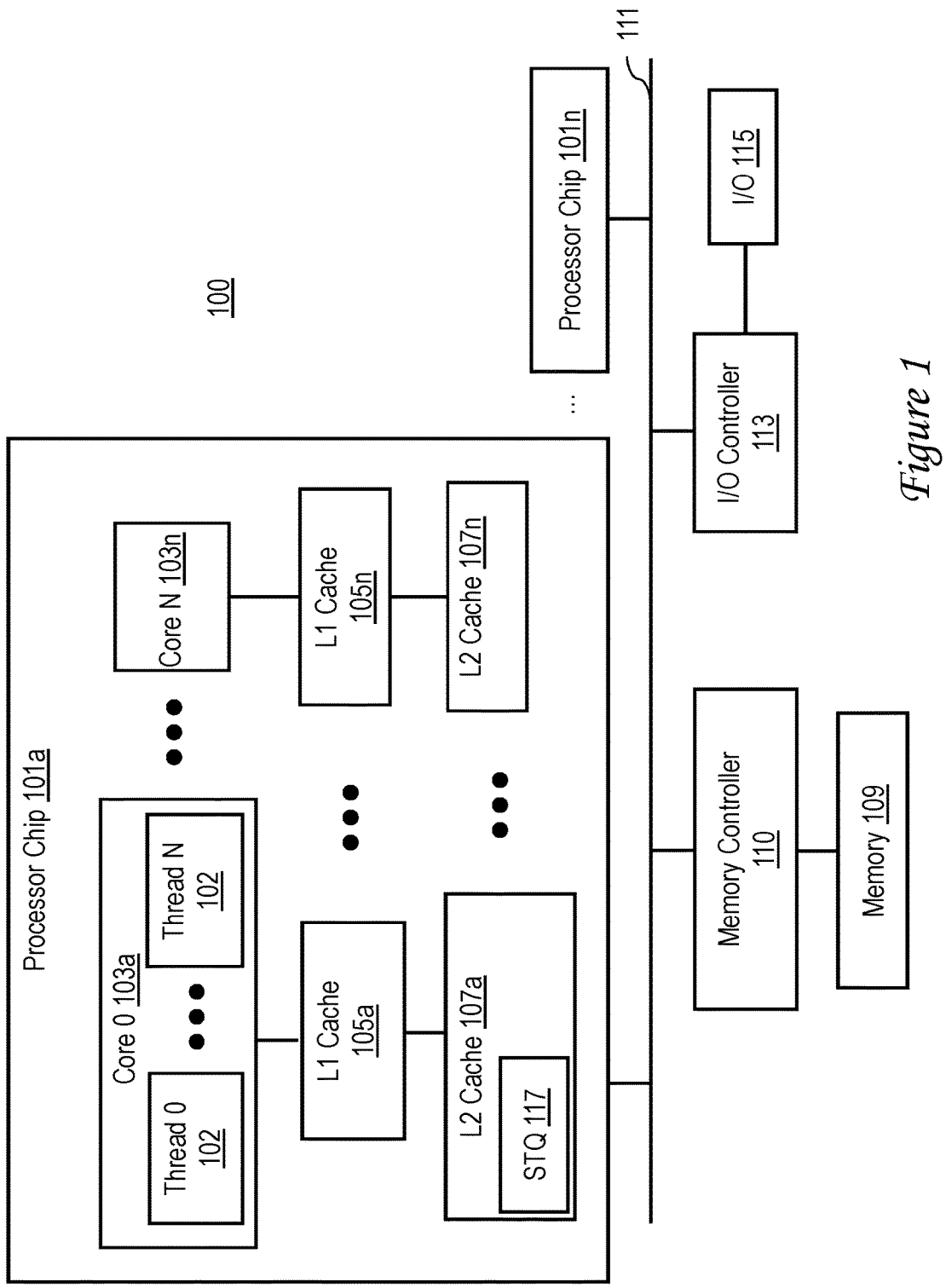
FIG. 1 is a diagram of a relevant portion of an exemplary data processing system that is configured to implement barriers to efficiently support cumulativity in a weakly-ordered memory system, according to the present disclosure.

With reference now to the figures and in particular, with reference to FIG. 1, a multiprocessor data processing system (MP) 100 is illustrated that includes one or more processor chips 101, memory 109, and input/output (I/O) device(s) 115. As is shown, I/O device(s) 115 have an associated I/O controller 113 and memory 109 has an associated memory controller 110 that controls access to memory 109. Processor chips 101 are coupled to memory 109 and I/O devices 115 via an interconnect 111 (e.g., a system bus that includes address, data, and control lines) by which processor chips 101 communicate with each other and with memory 109, I/O devices 115, and other peripheral devices. Interconnect 111 may be a bifurcated bus with a data bus for routing data and a separate address bus for routing address transactions and other operations or a more generalized interconnect possibly consisting of multiple point-to-point links between processor chips 101.

Processor chips 101 each include multiple (e.g., eight) processor cores 103 (each of which may execute one or more threads 102 and have an associated L1 cache 105 and an L2 cache 107. Each cache 105 and 107 includes a cache directory, an array of cache lines, and all data operations are completed according to a coherency protocol, e.g., a MESI coherency protocol or a variant thereof. The various features of the invention may be carried out by logic components on processor chips 101 and affect buffering of store operations at store queue (STQ) 117 and selection of entries for dispatch. For illustrative purposes, the various embodiments are described from the perspective of updating a cache line in an L2 cache with store operations and synchronization operations issued by a processor core and temporarily buffered in an STQ entry. An exemplary cache line may include multiple blocks/granules of data, corresponding to individual bytes, words, double words, etc., each of which may be the target of an update by a processor-issued store operation. The specific size of each cache line and number of updateable data blocks/granules may differ from system to system.

While the present invention is described with specific reference to an L2 cache within a multi-level cache architecture, it should be understood that the disclosed embodiments may be implemented at a different cache level. Embodiments of the present disclosure are described with reference to MP 100 and component parts of MP 100 illustrated by FIGS. 1, 4, and 10 (described below), but the present invention may be applied to different configurations of data processing systems that are not necessarily conventional. As an example, embodiments of the present disclosure may be implemented within a non-uniform memory access (NUMA) system, wherein the system memory (random access memory (RAM)) is divided among two or more memory arrays (having separate memory controllers connected to the system bus) and allocated among the processing units. Also, MP 100 may include additional hardware components not shown in FIG. 1, or have a novel interconnect architecture for existing components. MP 100 may also have a different number of processing units. Those skilled in the art will therefore appreciate that the present invention is not limited to the generalized data processing system illustrated in FIG. 1.

Weakly-ordered memory systems exploiting so called 'weak memory models' allow for a great deal of reordering of operations and for storage modifying operations to affect other processors in a non-atomic fashion (i.e., stores may take effect at various processor cores at different points in time). In weakly-ordered memory systems, in certain circumstances, it is desirable to enforce ordering and atomicity of operations. A typical mechanism for enforcing operation ordering and atomicity has utilized a 'synchronization fence', or 'barrier' instruction. Barrier instructions (barriers) force various load and store instructions (loads and stores) on either side of the barrier to be performed in-order relative to the barrier and to possibly restore the atomicity of stores (depending on barrier type) under certain circumstances. Barrier performance is generally a critical aspect of weak memory model machines and, as such, it is desirable to ensure that barriers execute in an efficient manner. In particular, achieving atomicity can often require that a barrier executed by one thread cause operations performed by another thread to be propagated in a specific manner in order to restore atomicity.

Figure 2:
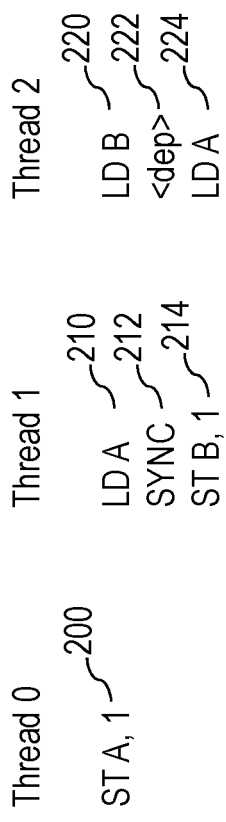
FIG. 2 is a diagram of an exemplary code snippet that is used to explain A-cumulativity.

With reference to FIG. 2, program snippets executed by thread zero (T0), thread 1 (T1), and tread 2 (T2) are provided to illustrate a notion referred to as A-cumulativity. In the program snippets of FIG. 2 (and similarly in FIG. 3 discussed below) it is assumed that threads 'T0' and 'T1' execute within data processing system 100 on a same processor core 103 (thereby sharing an L1 cache 105) and thread 'T2' executes on a different processor core and therefore accesses a different L1 cache 105. In the program snippets, it is assumed that all locations (i.e., addresses 'A' and 'B') start with an initial value of '0', 'SYNC' is a barrier instruction, and '<dep>' is an instruction or sequence of instructions that creates a data dependency that requires loads (i.e., LD B and LD A) on thread 'T2' to be performed in program order (this can be achieved, for example, by utilizing the value returned by an earlier load to form an address of a subsequent load). When threads 'T0' and 'T1' execute on a single processor core (i.e., share an L1 cache), it is possible for the thread 'T1' to read a value stored by 'T0' (e.g., upon executing ST A, 1) from the L1 cache before a store to address 'A' (e.g., ST A, 1) has propagated to the thread 'T2', which executes on a different processor core. Following execution of a load to address 'A' (e.g., LD A), the thread 'T1' executes a SYNC followed by a store to address 'B' (e.g., ST B, 1).

Since the barrier (SYNC) is cumulative (i.e., any stores by other threads that are visible to the thread executing the barrier must also be propagated by the barrier ahead of any stores that occur in the thread after the barrier instruction), the SYNC for the thread 'T1' ensures that the store to address 'A' (i.e., ST A, 1) becomes visible to any given processor core (in this case the processor core that executes the thread 'T2') before the store to address 'B' (i.e., ST B, 1) becomes visible to that processor core (T2). In conventional implementations, this is achieved by having barriers from a given processor core force all older stores, regardless of the thread that executed the store, through a store queue (STQ) of an associated L2 cache before any stores from that core that are younger than the barrier. The above scenario is referred to herein as 'A-cumulativity'. Unfortunately, this cross-thread ordering occurs whether or not the thread executing the barrier has actually read from storage locations updated by other cross-thread stores. In the absence of a read that establishes the visibility of a cross-thread store to the thread executing the barrier, it is not strictly necessary to propagate the other thread store ahead of the barrier. While the conventional implementation is relatively simple to realize, the conventional implementation can cause performance delays for a given barrier which may have to wait for many stores in the STQ that are not architecturally required to be ordered by the barrier.

Execution of the exemplary program in FIG. 2 illustrates the property of causality in a multiprocessor data processing system. As used herein 'causality', which is a desirable property in multiprocessor programs, is defined as being preserved if, during execution of a multiprocessor program, a given thread of execution cannot read the effects (e.g., the LD of B in T2) of a computation before the writes that caused the computation (e.g. the ST of A by T0) can be read by the given thread.

In FIG. 2, thread 'T0' executes a store 200 that writes a value of '1' to address 'A' in the distributed shared memory system. This update of address 'A' propagates to thread 'T1', and load 210 executed by thread 'T1' therefore returns a value of 1 (as thread 'T0' and thread 'T1' execute on a same processor core 103 and access a same L1 cache 105). Even though the memory update made by store 200 has propagated to thread 'T1', that memory update may not yet have propagated to thread 'T2' (as thread 'T2' executes on a different processor core 103 and accesses a different L1 cache 105). If store 214 executes on thread 'T1' and the associated memory update propagates to thread 'T2' before the memory update of store 200 propagates to thread 'T2', causality would be violated because the store of the value of '1' to address 'B', which is an effect of the store to address 'A', would be visible to thread 'T2' before the memory update associated with store 200 was visible to thread 'T2'.

To guarantee causality in a weak memory model system, barrier 212 (i.e., a synchronization instruction (SYNC)) is implemented to ensure that store 214 does not take effect or begin propagating its memory update to other processor cores until load 210 has bound to its value. In addition, barrier 212 also ensures that the memory update associated with store 200 propagates to thread 'T2' before the memory update associated with store 214. Thus, causality is preserved because the cause of the computation (i.e., the memory update of store 200) is visible to thread 'T2' before the result of the computation (i.e., the memory update of store 214). Data dependency 222 is also enforced by thread 'T2' to ensure that the thread 'T2' executes loads 220 and 224 and binds their values in program order to guarantee that the thread 'T2' properly observes the memory updates made by the thread 'T0' and the thread 'T1'.

Figure 3:
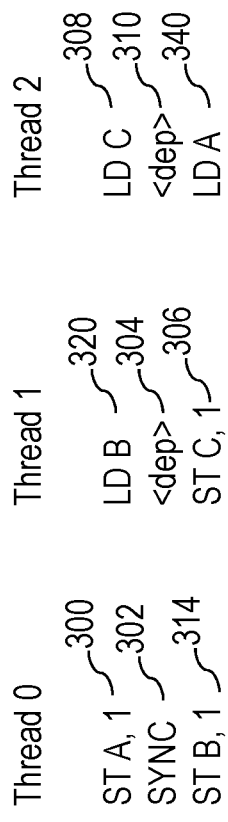
FIG. 3 is a diagram of an exemplary code snippet that is used to explain B-cumulativity.

With reference to FIG. 3, different program snippets, executed by thread zero (T0), thread 1 (T1), and thread 2 (T2) are provided to illustrate the notion referred to as B-cumulativity. In FIG. 3, it is assumed that threads 'T0' and 'T1' execute on a same processor core 103, and thread 'T2' executes on a different processor core 103. Thread 'T0' executes a store 300 that writes a value of '1' to address 'A' in the distributed shared memory system, a SYNC 302, and a store 314 that writes a value of '1' to address 'B' in the distributed shared memory system. The thread 'T1' executes a load 320 that reads a value at address 'B' in the distributed shared memory system, a data dependency (<dep>) 304, and a store 306 that writes a value of '1' to address 'C' in the distributed shared memory system. The thread 'T2' executes a load 308 that reads a value at address 'C' in the distributed shared memory system, a data dependency (<dep>) 310, and a load 340 that reads a value at address 'A' in the distributed shared memory system. In the program snippets, the B-cumulativity property of SYNC 302 ensures that store 300 propagates to any given processor core 103 before any store (in this case store 306) that occurs after a load that has read from any store ordered after the barrier (in this case store 314). B-cumulativity is extended recursively through as many threads as are applicable (by virtue of reading some store ordered after the barrier or ordered after a load that has read from a store previously ordered after the barrier). Therefore SYNC 302, executed by the thread 'T0', ensures that store 314 to address 'B' (i.e., ST B, 1) which occurs after SYNC 302 on the thread 'T0' and store 306 to address 'C' (i.e. ST C,1) will occur at all processor cores 103 in the system after store 300 to address 'A' (i.e., ST A, 1). This ensures that the thread 'T2' will read the new value of '1' at the address 'A' if thread 'T1' reads the value of '1' at the address 'B'.

Figure 4:
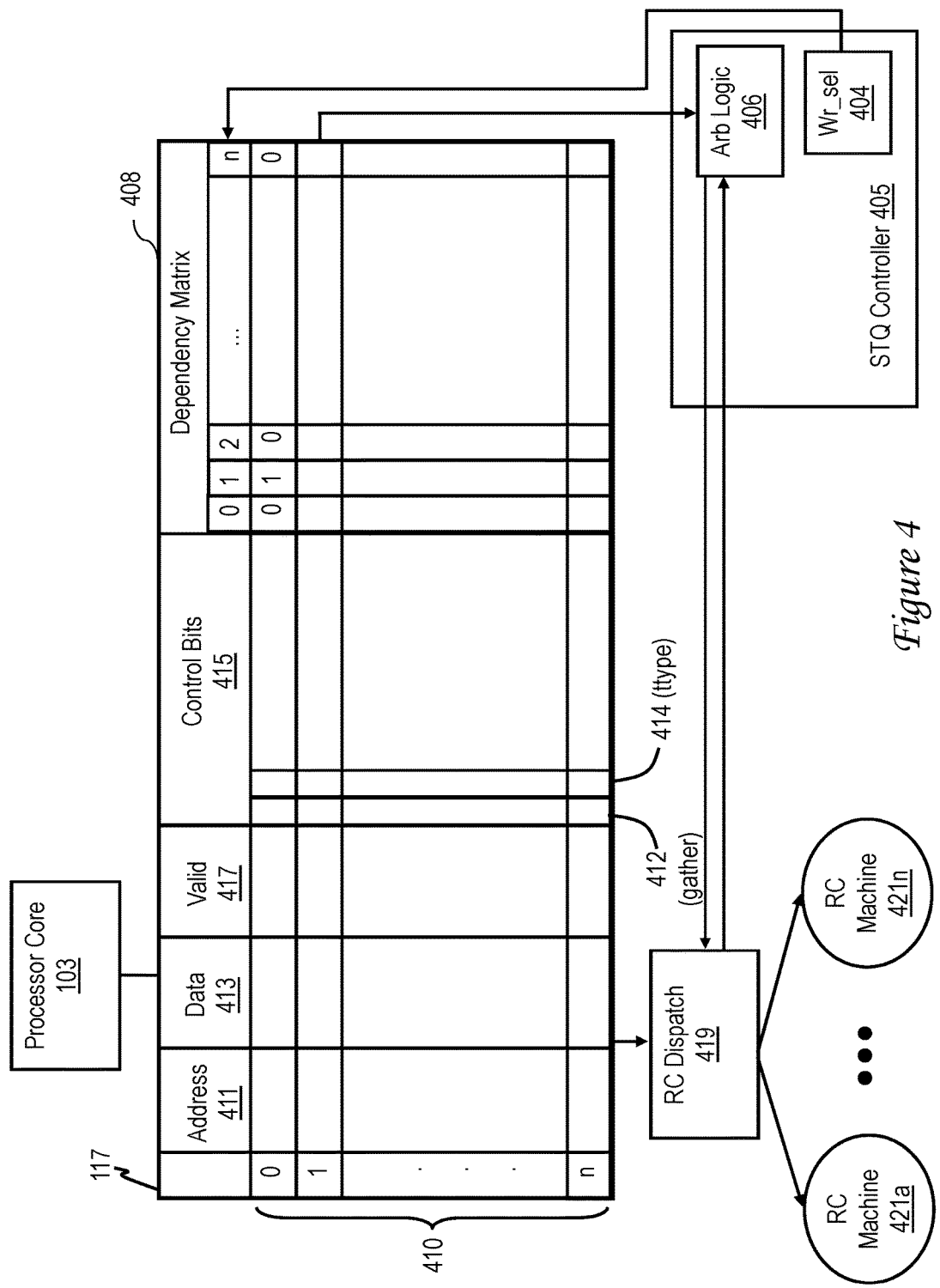
FIG. 4 is a diagram of an exemplary store queue (STQ) and associated logic that is configured according to the present disclosure to implement barriers to efficiently support cumulativity in a weakly-ordered memory system, according to the present disclosure.

With reference to FIG. 4, store queue (STQ) 117 of processor chip 101 of FIG. 1 is illustrated in additional detail. As illustrated, STQ 117 includes a collection of entries 410 comprised of standard registers for storing information regarding store and barrier operations, namely address register 411, data register 413, control bits 415, and valid bit 417. Address register 411 contains the address, if applicable, of the operation in the entry, data register 413 contains store data values if the entry holds a store operation, and valid bit 417 indicates that entry contains a valid operation. STQ 117 also includes a byte enable register (not shown) that includes a number of bits, each corresponding to a smallest size of store granule within data register 413 indicating those bytes, if any, in register 413 that contain valid data. Among other control information, control bits 415 also include a gather bit 412 and a transaction type (ttype) field 414. Gather bit 412 is utilized to determine whether subsequent store operations to the same address may be gathered (also known as coalescing) into the entry. The interval of time in which gather bit 412 is active is known as a 'gather window'. Such gathering of stores reduces traffic to L2 cache 107 and to main memory 109. Transaction type (ttype) field 414 is utilized to indicate the type of operation contained in the entry within STQ 117, minimally whether the associated operation is a store or some form of barrier instruction (SYNC). For simplicity, the discussion herein utilizes cache lines having a length/capacity of 128-bytes that are updated via a plurality of processor-issued store operations.

STQ 117 also includes a dependency matrix 408 that includes a number of bits, where each row represents dependencies of each store queue entry on other store queue entries. For example, a '1' in a row indicates that the entry corresponding to that row cannot be dispatched until the STQ entry corresponding to the column with the '1' has dispatched and, if necessary, completed processing in RC machine 421. For example, as depicted in FIG. 4, store queue entry '0' is dependent on store queue entry '1' and, as such, store queue entry '0' cannot be dispatched before store queue entry '1' has been dispatched and completed processing in RC machine 421. STQ controller 405 includes a write select (Wr_sel) pointer 404 and arbitration (Arb) logic 406. Write select pointer 404 selects empty entries to hold new operations when a processor core 103 sends a new operation to STQ 117 that does not gather into an existing entry. It should be appreciated that write select pointer 404 can utilize any appropriate algorithm to select an empty store queue entry, such as with a priority encode algorithm that enables write select pointer 404 to select an empty entry from any entry with valid bit 417 set to '0' (indicating an entry that may be overwritten).

Arbitration logic 406 examines STQ 117 for eligible entries to send to RC dispatch logic 419 for dispatch to RC machines 421. A store queue entry 410 is eligible for transmission to RC dispatch logic 419 when the dependency matrix row corresponding to the particular store queue entry indicates that all dependencies are cleared and other necessary processing in RC machines 421 have completed. RC machines 421 independently and concurrently service load (LD) and store (ST) requests received from an affiliated processor core 103.

In order to service remote memory access requests originating from non-affiliated processor cores 103, i.e., processor cores that do not share an L2 cache, L2 cache 107 may also include multiple snoop machines (not shown). Each snoop machine can independently and concurrently handle a remote memory access request "snooped" from local interconnect 111. As will be appreciated, the servicing of memory access requests by RC machines 421 may require the replacement or invalidation of memory blocks within a cache array (not shown) of L2 cache 107. L2 cache 107 may also include CO (castout) machines (not shown) that manage the removal and writeback of memory blocks from the cache array. While an RC machine 421 is processing a local memory access request, RC machine 421 has a busy status and is not available to service another request. RC machine 421 may, however, perform a directory write to update a relevant entry of a directory while busy. In addition, RC machine 421 may also perform a cache write to update the relevant cache line of a cache array and other functions.

Figure 5:
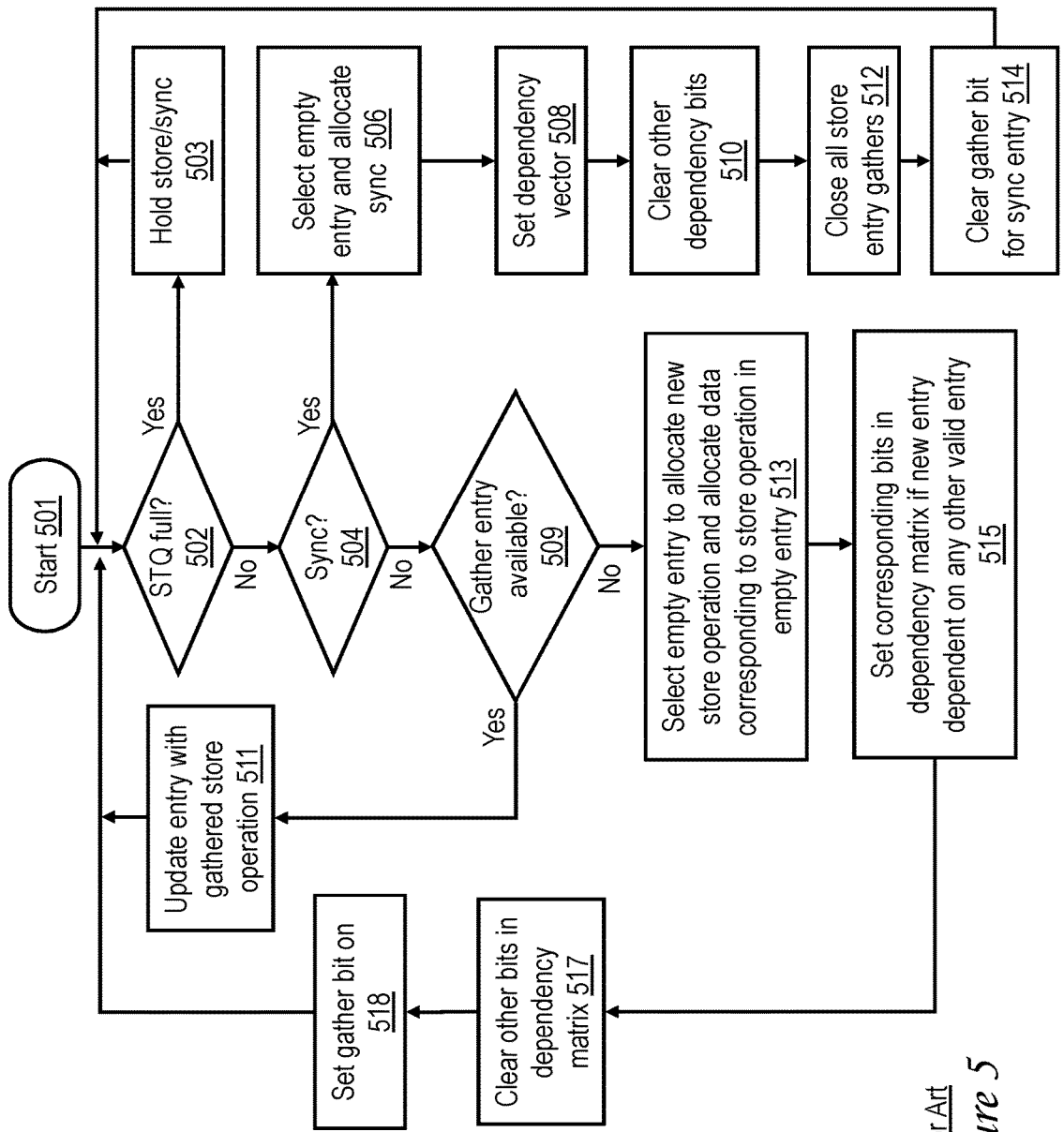
FIG. 5 is a flowchart of an exemplary conventional process for handling barriers (i.e., synchronization instructions (SYNCs)) and store instructions (stores) in a conventional STQ.

FIG. 5 is a high-level logical flowchart depicting an exemplary conventional process employed in writing a new store queue entry in response to a store queue (STQ) receiving a new store or SYNC operation from an associated processor core. In the discussion of FIGS. 5-9 reference is made to components of FIGS. 1 and 4, as the components would have conventionally operated, to facilitate better understanding. It should, however, be appreciated that FIGS. 1 and 4 are configured according to the present disclosure, as is further discussed in FIGS. 10-14. The process of FIG. 5 begins at block 501 in response to, for example, a processor core 103 issuing a store operation or a SYNC operation to STQ 117. In decision block 502, STQ controller 405 determines whether STQ 117 is full. In response to STQ 117 being full in block 502 control transfers to block 503, where STQ controller 405 sends a message instructing processor core 103 to halt sending store operations and SYNCs until some entries in STQ 117 have been dispatched by associated RC dispatch logic 419. From block 503, control returns to block 502.

In response to STQ 117 not being full in block 502 control transfers to decision block 504, where STQ controller 405 determines whether the issued operation is a SYNC. In response to the issued operation being a SYNC, control transfers to block 506. In block 506, STQ controller 405 selects an empty entry in STQ 117 in which to allocate the SYNC. Next, in block 508, STQ controller 405 sets the dependency vector in dependency matrix 408 for the SYNC. Then, in block 510, STQ controller 405 clears the other dependency bits. For example, if for a new SYNC operation write select pointer 404 updates store queue entry '0' and STQ controller 405 determines that entry '0' is dependent only on entry '1', STQ controller 405 enters a '1' into row 0, column 1 of dependency matrix 408 (at block 508) while entering a '0' in the rest of the columns in row 0 (at block 510). Next, in block 512, STQ controller 405 closes all currently active store entry gather bits 412 to ensure that a store after the barrier does not re-order ahead of the barrier by gathering into an older entry in STQ 117. Then, in block 514, STQ controller 405 clears gather bit 412 for the SYNC entry (stores may not gather with SYNC operations). From block 514 control returns to block 502.

In response to the issued operation not being a SYNC in block 504 (i.e., a store operation was received at STQ 117), control transfers to decision block 509 where STQ controller 405 determines, by examining address registers 411 and gather bits 412, whether an existing entry (for the same cache line address) is currently available for gathering the store operation. It should be appreciated that gathering of store operations involves combining a series of store operations writing to the same cache line in STQ 117 in the same store queue entry before the cache line is dispatched to the RC dispatch logic 419. If STQ controller 405 determines that the new store operation can be gathered into an existing STQ entry, the process continues to block 511, where STQ controller 405 updates gatherable entry data field 413 with data of the new store operation. From block 511, control returns to block 502 and continues in an iterative fashion.

In response to a determination at block 509 that the new store operation cannot be gathered into an existing STQ entry, control transfers to block 513. In block 513 STQ controller 405 (using write select pointer 404) selects an empty entry to allocate to the new store operation. The new data, address, and byte enable data corresponding to the new store operation are inserted into the new entry by STQ controller 405. Next, in block 515, STQ controller 405 sets bits in dependency matrix 408 (if appropriate) that correspond to valid entries in STQ 117 that have a dependent relationship with the new entry (where the new entry is dependent on the other valid entries). A new entry is dependent on another STQ entry if, among other things, the store operation characterized by the new entry requires an access to the same address as the other store queue entry or the other STQ entry is a SYNC operation. Then, in block 517, STQ controller 405 clears the bits in dependency matrix 408 corresponding to STQ entries on which the new entry is not dependent. Next, in block 518, STQ controller 405 sets gather bit 412 of the new entry to enable store gathering in the new entry. Following block 518 control returns to block 502.

Figure 6:
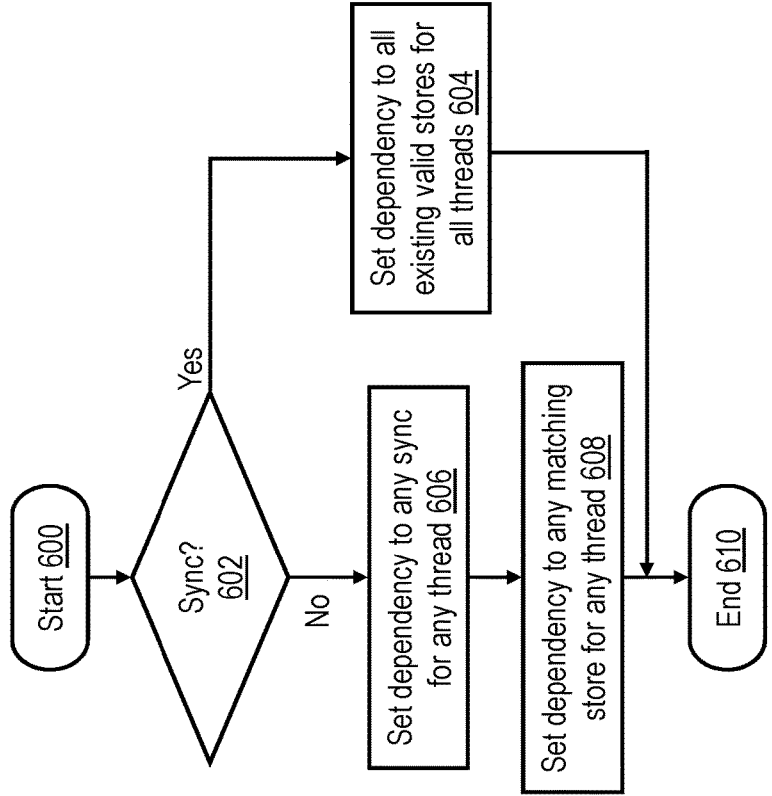
FIG. 6 is a flowchart of an exemplary conventional process for setting dependencies for SYNCs and store instructions in a conventional STQ.

With reference to FIG. 6, a flowchart of an exemplary conventional process for setting dependencies in dependency matrix 408 for SYNCs and stores in STQ 117 of FIG. 4 is illustrated. The process is initiated in block 600 in response to STQ 117 receiving an operation (i.e., a SYNC or store instruction) from processor core 103. Next, in decision block 602 STQ controller 405 determines whether the received operation is a SYNC. In response to the received operation being a SYNC in block 602, control transfers to block 604 where STQ controller 405 sets a dependency for the store to all existing valid stores for all threads in STQ 117. As described above with reference to FIGS. 2 and 3, setting a dependency to all valid stores regardless of thread partially ensures A and B cumulativity, but may also order more stores than is strictly necessary. Following block 604, control transfers to block 610 where the process terminates. In response to the received operation not being a SYNC (i.e., the received operation is a store) in block 602, control transfers to block 606 where the STQ controller 405 sets a dependency for the store to any SYNC for any thread. As described above with respect to FIGS. 2 and 3, setting a dependency for the store to the SYNC for any thread partially ensures A and B cumulativity, but may also order more stores than is strictly necessary. Next, in block 608, STQ controller 405 sets a dependency to any matching store (i.e., a store that shares the same target address) for any thread. Following block 606, control transfers to block 610 where the process terminates.

Figure 7:
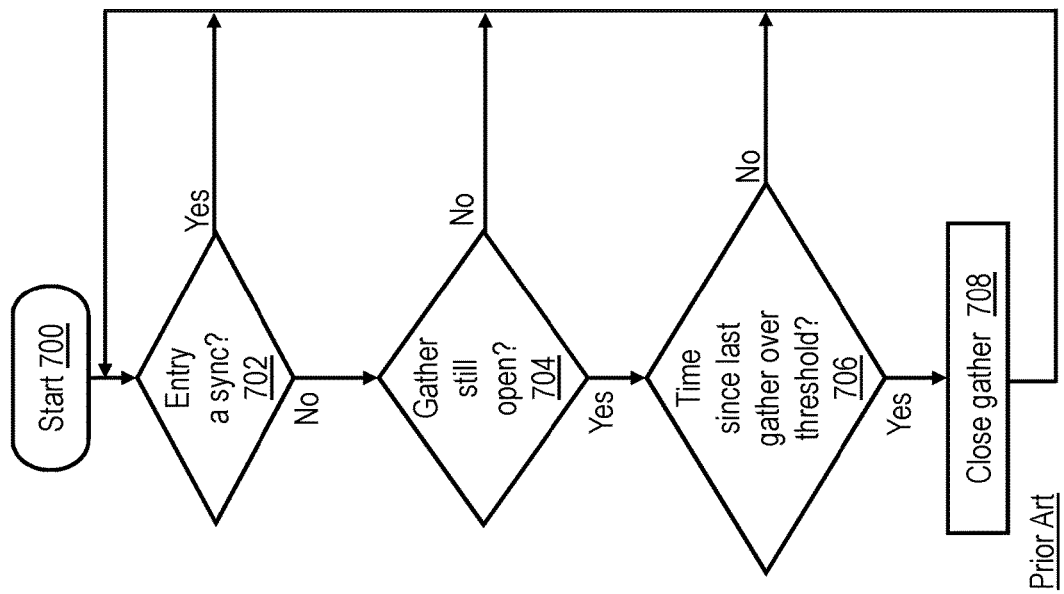
FIG. 7 is a flowchart of an exemplary conventional process for closing a store gather window.

With reference to FIG. 7, a flowchart of an exemplary conventional process for closing a gather window by resetting gather bit 412 for an entry in STQ 117 is illustrated. The process depicted in FIG. 7 may execute in parallel for all store queue entries. The process is initiated in block 700, at which point control transfers to decision block 702. In block 702, STQ controller 405 determines whether the entry in STQ 117 is a SYNC. In response to the entry being a SYNC in block 702 control loops on block 702, as SYNCs are not gathered and therefore gather bit 412 is never set. In response to the entry not being a SYNC (i.e., the entry is a store) in block 702 control transfers to decision block 704, where STQ controller 405 determines whether the gather window for the entry is still open (e.g., whether gather bit 412 is still set).

In response to the gather window not being open (i.e., gather bit 412 is reset) in block 704, control transfers to block 702. In response to the gather window being open in block 704, control transfers to decision block 706. In block 706, STQ controller 405 determines whether a time since a last gather is greater than a threshold. In response to the time since the last gather for the entry not being greater than the threshold in block 706, control transfers to block 702. In response to the time since the last gather for the entry being greater than the threshold in block 706, control transfers to block 708 where the STQ controller 405 closes the gather window by resetting gather bit 412 for the entry. Control then transfers to block 702 and the process proceeds in an iterative fashion.

Figure 8:
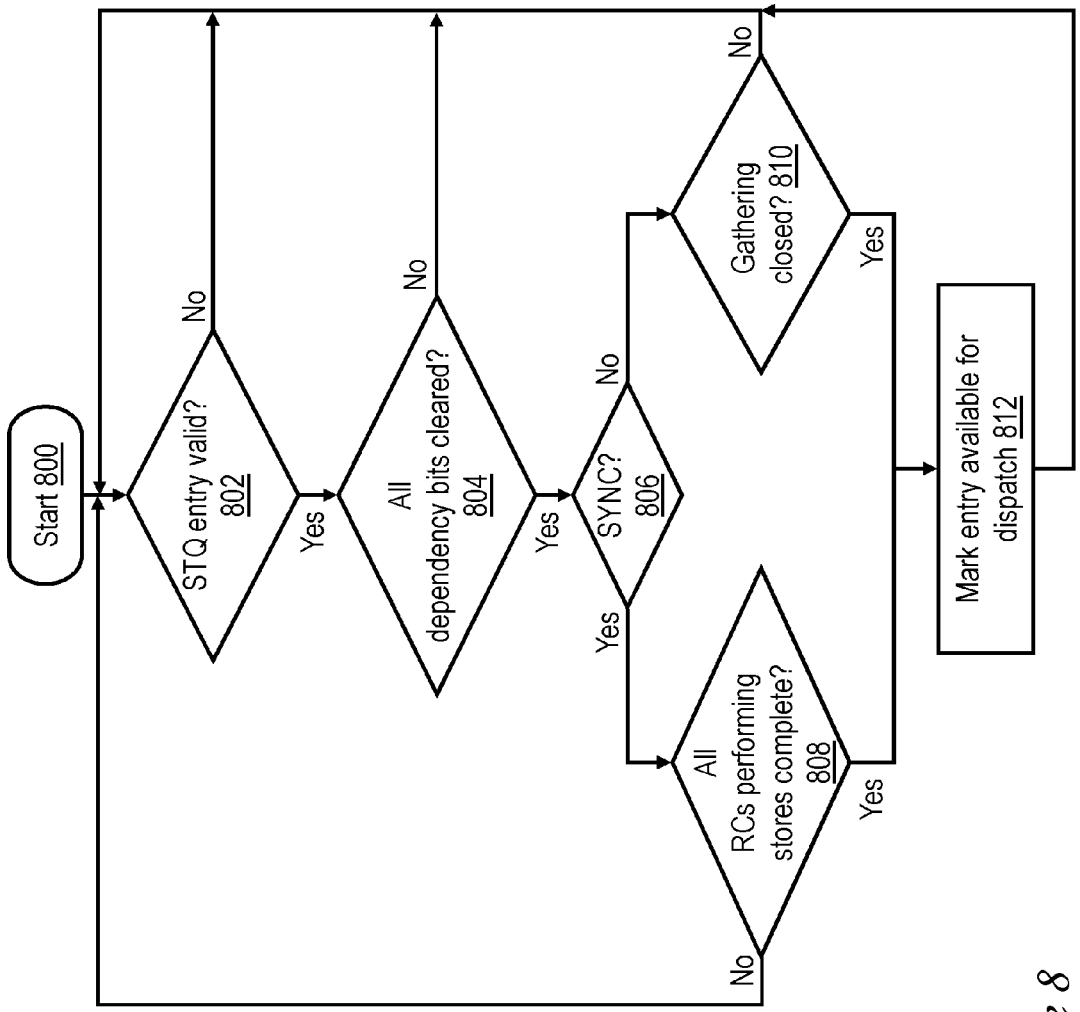
FIG. 8 is a flowchart of an exemplary conventional process for marking an entry in a conventional STQ available for dispatch to a read-claim (RC) machine.

In reference now to FIG. 8, illustrated is a high-level logical flowchart of an exemplary conventional process for determining whether a specific entry in STQ 117 is eligible for dispatch by RC dispatch logic 419. The process depicted in FIG. 8 may execute in parallel for all store queue entries. The process begins at block 800 and proceeds to block 802, where STQ controller 405 determines whether or not a particular entry in STQ 117 is valid. For example, STQ controller 405 may determine the validity of a particular entry by examining the contents of associated valid bit 417. In response to STQ controller 405 determining that the entry is not valid, the process returns to block 802 and proceeds in an iterative fashion. Returning again to block 802, if STQ controller 405 determines that the store queue entry is valid, the process proceeds to decision block 804 where STQ controller 405 determines whether all dependency bits in dependency matrix 408 for the entry are cleared.

In response to all dependency bits not being cleared for the entry in block 804, control returns to block 802. In response to all dependency bits being cleared for the entry in block 804, control transfers to decision block 806 where STQ controller 405 determines whether the entry is an entry for a SYNC. If the entry does not correspond to a SYNC (i.e., the entry corresponds to a store) in block 806, control transfers to decision block 810 where STQ controller 405 determines whether gathering is closed (i.e., whether gather bit 412 for the STQ entry is reset) for the store.

If STQ controller 405 determines that the entry has not finished gathering associated store operations into the entry in block 810, control transfers to block 802. However, if STQ controller 405 determines that the entry has finished gathering in block 810, control transfers to block 812 where STQ controller 405 marks the entry (e.g., in an unillustrated control bit of control bits 415) as available for dispatch. Following block 812 control transfers to block 802 where the process continues iteratively.

Returning to block 806, when STQ controller 405 determines that the entry is for a SYNC, control transfers to block 808 where the STQ controller 405 determines whether all RC machines 421 that are performing stores have completed processing of their store operations. Conventionally, RC machines 421 do not complete a store operation until the store's effects have propagated to all other processor cores or achieved the same net effect. In response to a determination at block 808 that all RC machines 421 have not completed performing their respective stores, control transfers to block 802. The barrier waiting for all RC machines 421 to complete store operations for all threads partially ensures A and B cumulativity, but may order more store operations than is strictly necessary. In response to a determination at block 808 that all RC machines 421 processing store operations have completed their processing, control transfers to block 812 where STQ controller 405 marks the entry in STQ 117 for the SYNC operation as available for dispatch.

Figure 9:
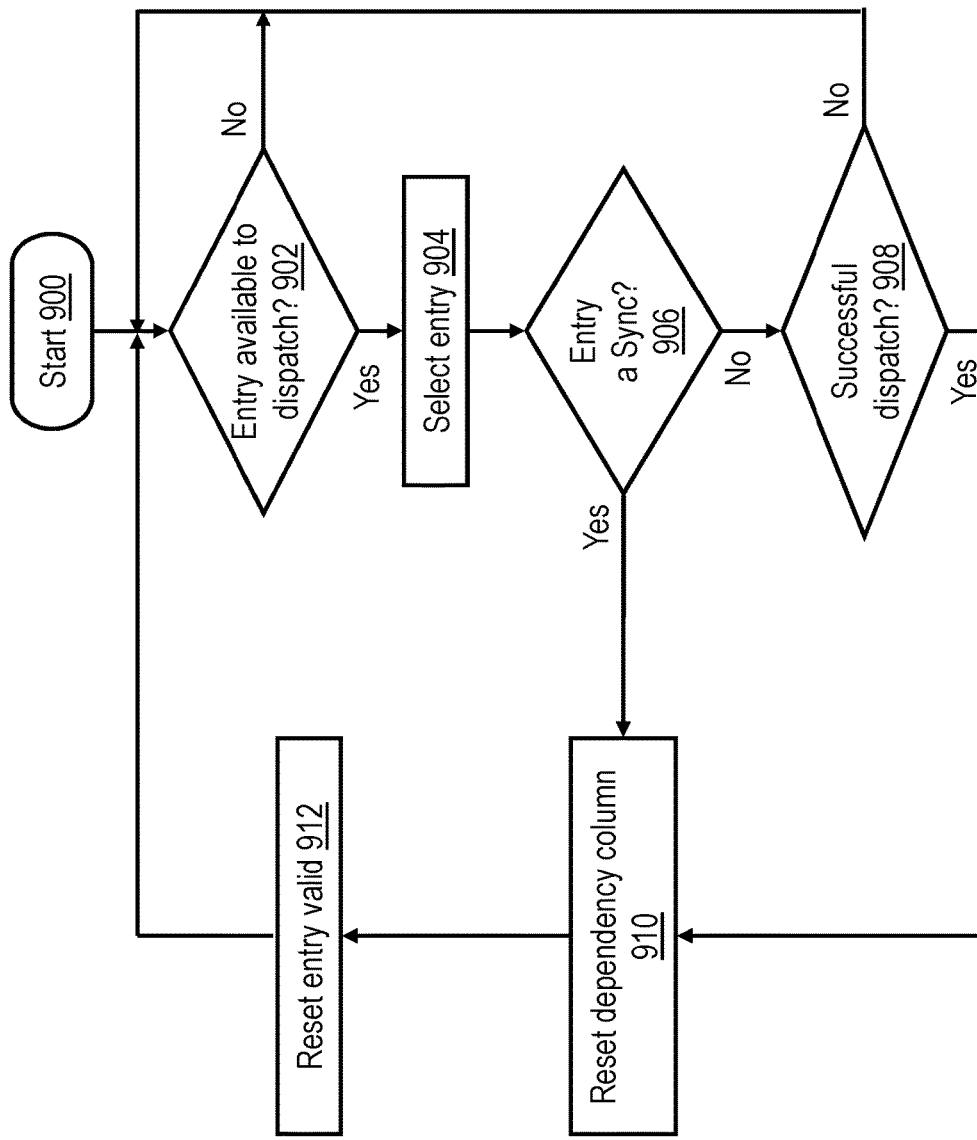
FIG. 9 is a flowchart of an exemplary conventional process for resetting dependencies for dispatched entries in a conventional STQ.

With reference to FIG. 9, a flowchart of an exemplary conventional process for dispatching entries in STQ 117 to RC machines 421 and resetting associated entries in dependency matrix 408 is illustrated. The process is initiated at block 900, at which point control transfers to decision block 902. In block 902, STQ controller 405 determines whether or not an entry in STQ 117 is available for dispatch (i.e., whether an entry is marked available for dispatch as described above with respect to FIG. 8). In response to an entry not being available for dispatch, control loops on block 902. In response to an entry being available for dispatch in block 902, control transfers to block 904 where STQ controller 405 selects an entry that is available for dispatch. Next, in decision block 906, STQ controller 405 determines whether the selected entry contains a SYNC operation. In response to the entry containing a SYNC in block 906, control transfers to block 910 (a SYNC requires no direct processing by an RC machine 421, but rather is complete based on waiting for RC machines 421 to complete their prior store operations).

In block 910, STQ controller 405 resets the dependency column in dependency matrix 408 corresponding to the dispatched entry to indicate the STQ entries formerly dependent on the just dispatched entry are no longer dependent on that entry. For example, if entry 0 is dependent on entry 1, a '1' in row 0, column 1 of dependency matrix 408 indicates this dependency. When entry 1 dispatches, row 0, column 1 and column 1 in all other rows besides row 1 of dependency matrix 408 are updated with a '0' to remove the dependency of any entries in STQ 117 on the recently dispatched entry 1. Next, in block 912, STQ controller 405 resets the valid bit for the selected entry (indicating that the selected entry is no longer valid and may be used by a new operation that is received at STQ 117).

In response to the selected entry not being a SYNC in block 906 (i.e., the entry corresponds to a store), control transfers to decision block 908. In block 908, STQ controller 405 determines whether the entry successfully dispatched to an RC machine 421. In response to STQ controller 405 determining that the entry was not successfully dispatched to an RC machine 421 (e.g., an RC machine 421 was not available) in block 908, control transfers to block 902. In response to the STQ controller 405 determining that the entry was successfully dispatched to an RC machine 421 in block 908, control transfers to block 910, then to block 912, which have been described, and finally to block 902.

According to the present disclosure, the ordering effects of barriers are applied in a more precise manner to reduce undue ordering effects for operations that are not required to be ordered. As described above with respect to FIGS. 2 and 3, when a first thread reads a store from a second thread that is visible to the first thread, before the store has been performed with respect to other processor cores (e.g., the ST A, 1 by Thread 0 relative to Thread 1 in FIG. 2 and the ST B, 1 by Thread 0 relative to Thread 1 in FIG. 3), an obligation to order the store that was read according to A-cumulativity and B-cumulativity has been conventionally incurred by the reading thread. At the point the reading thread binds the load value, the reading thread is 'polluted' by the store. In the case of A-cumulativity, this means that any barrier executed by the polluted thread must order any polluting store ahead of any stores after the barrier. Similarly for B-cumulativity, any stores executed by a polluted thread after reading a polluted store must be ordered after the store that originally polluted the thread relative to any other processor cores. Any store ordered by a polluted store (by virtue of being after the read of a polluted store by a given thread) are also considered polluted and recursively defines a set of stores ordered by B-cumulativity for a given original polluted store.

According to the present disclosure, a 'pollution vector' is created at each entry in STQ 117 and RC machine 421 that tracks which threads are currently polluted by the store resident in an entry of STQ 117 or RC machine 421. In at least one embodiment, pollution vectors are as wide in bits as the number of threads on a given processor core 103. As described below with respect to FIGS. 11-14, the pollution vectors may be used to more precisely set dependencies in, for example, existing dependency matrix 408, to reduce the number of unnecessary ordering effects.

In various embodiments, the addresses of loads (LD Address) that hit in the L1 cache (polluting loads) are broadcast to STQ 117 and RC machines 421 of an associated L2 cache where the addresses of the polluting loads are compared to active addresses 411 in STQ 117 and active addresses in address register 1015 in RC machines 421. In the case of an address match in an active structure, a respective bit in the pollution vector for that entry is set to indicate the thread that issued the LD hit is polluted by the store resident at the matching entry of STQ 117 or RC machine 421. In this manner, the pollution vector indicates which threads the entry in the active entry of STQ 117 or RC machine 421 pollutes.

In one or more embodiments, when a pollution vector bit is set for a given thread, active gather stations for the given thread have their gather windows closed by resetting the appropriate gather bit 412 to prevent a subsequent store by the given thread (which is ordered for B-cumulativity) from being gathered with an earlier unrelated store. For example, consider the B-cumulativity example of FIG. 3 with an unrelated (and unillustrated) store to address 'C' (ST C, 7) that occurs before load 320 from address 'B' (i.e., LD B) on thread 'T1'. In such a case, store 306 (the final ST C on Thread 1) needs to be ordered by cumulativity and cannot be gathered into the ST C, 7 before load 320. If store 306 gathered with the assumed 'ST C, 7' it would potentially violate B-cumulativity by propagating before store 314 to other threads. At the point the load on the thread 'T1' pollutes that thread, gathering at any active entry of STQ 117 by the thread must shut down to prevent this error. However, a subsequent store to 'C' that occurs after store 306 on thread 'T1' can be gathered with store 306.

In various embodiments, when a thread issues a SYNC to L2 cache 107, bits in the dependency matrix 408 for the SYNC are set so as to make the SYNC dependent on the completion of all prior stores from that thread in any entry of STQ 117. In addition, the SYNC is also made dependent on any polluting stores in any entry of STQ 117 to allow the SYNC to precisely honor A-cumulativity obligations. In various embodiments, a SYNC is released from STQ 117 when the dependency vector for the SYNC clears. It should be appreciated that the pollution vector for a SYNC entry in STQ 117 is always empty, as SYNCs do not pollute other threads, only stores pollute other threads. Moreover, SYNC operations do not have addresses and therefore no comparison is possible to set pollution vector bits.

In at least one embodiment, when a store is issued to STQ 117, the store is made dependent on all prior stores with a matching target address in any thread (to preserve per address ordering known as coherence) and all stores from any other thread (a thread's store cannot pollute itself) that pollute the thread issuing the store. In one or more embodiments, the store waits for all of its dependencies to clear before it can dispatch to an RC machine. It should be appreciated that the disclosed techniques allow a STQ to more precisely honor ordering requirements of barriers, as compared to the conventional approach of making barriers affect all prior stores across all threads.

Figure 10:
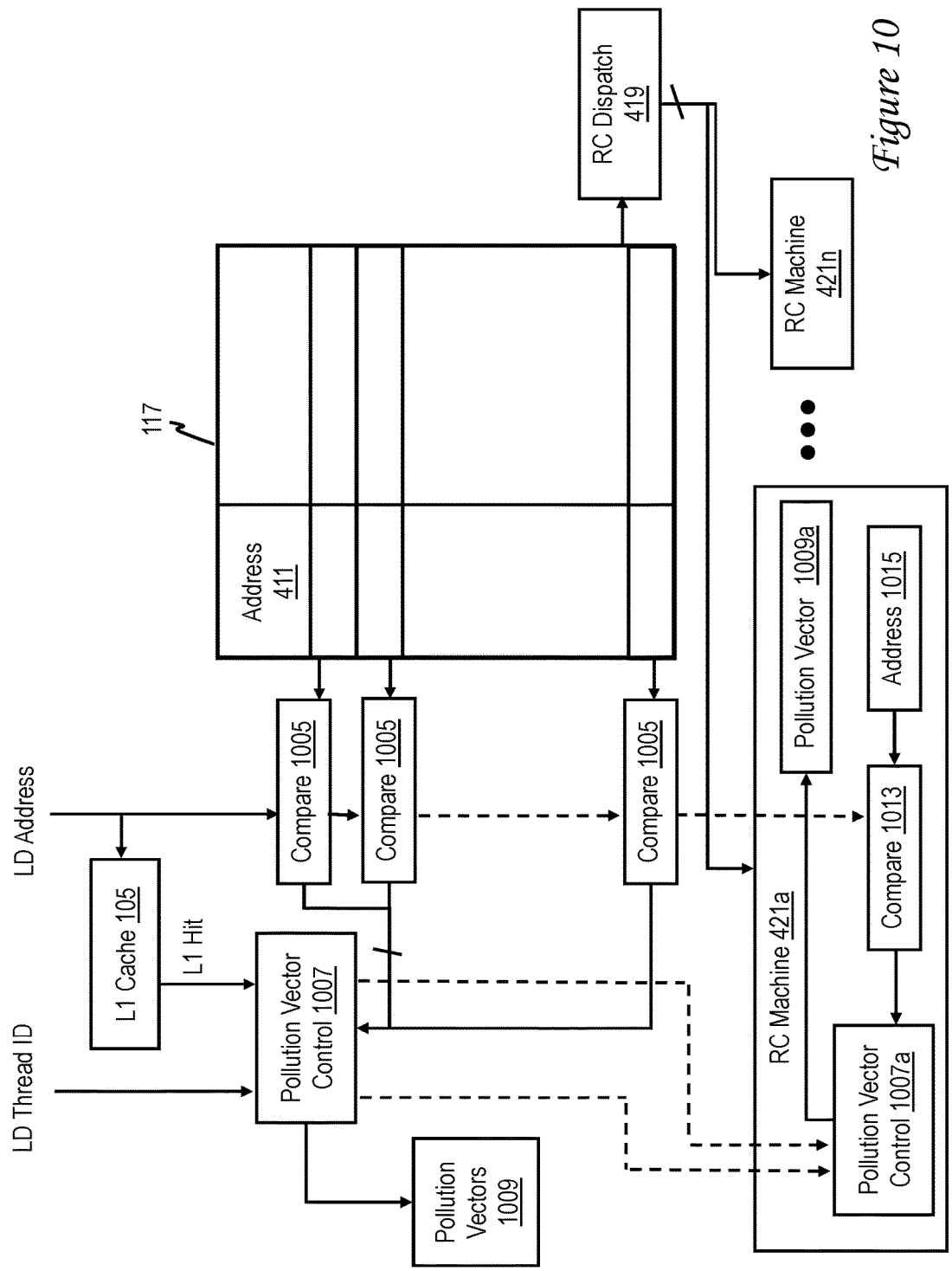
FIG. 10 is a diagram that depicts a relevant portion of the STQ of FIG. 4 in additional detail with additional logic for implementing embodiments of the present disclosure.

With reference to FIG. 10, a relevant portion of L2 cache 107 of FIG. 4 (with logic for implementing aspects of the present disclosure) is illustrated in additional detail. As is illustrated, a pollution vector control 1007 receives an L1 hit signal from L1 cache 105 and a load (LD) thread identifier (ID). Pollution vector control 1007 also receives a plurality of compare signals from compare blocks 1005, which receive an LD address (from processor core 103) and respectively compare the LD address to addresses maintained in address register 411 of STQ 117. In the event of an address match in STQ 117 on a hit in L1 cache 105, pollution vector control 1007 creates a pollution vector for an associated entry (in STQ 117) in pollution vector block 1009. Similarly, RC machines 421 include a compare block 1013 that is configured to compare the LD address with an address (for a dispatched entry that was formerly maintained by STQ 117 in address register 411) in address register 1015 of RC machines 421. RC machines 421 also include a pollution vector control 1007a that receives the LD thread ID, the L1 hit signal, and an address match signal and creates a pollution vector that is stored in pollution vector block 1009a when the LD address matches the address stored in address register 1015 on an L1 hit.

Pollution vector block 1009 includes pollution vectors for tracking, for each valid store in STQ 117 of L2 cache 107, which threads are polluted by the store. Pollution vectors in pollution vector blocks 1009a track, for each given thread, which threads the store present in read-claim (RC) machines 421 of L2 cache 107 currently pollutes. In various embodiments, pollution vectors included in pollution vector blocks 1009 and 1009a are used to more precisely set dependencies in dependency matrix 408 of L2 cache 107 to significantly reduce unnecessary ordering effects.

Figure 11:
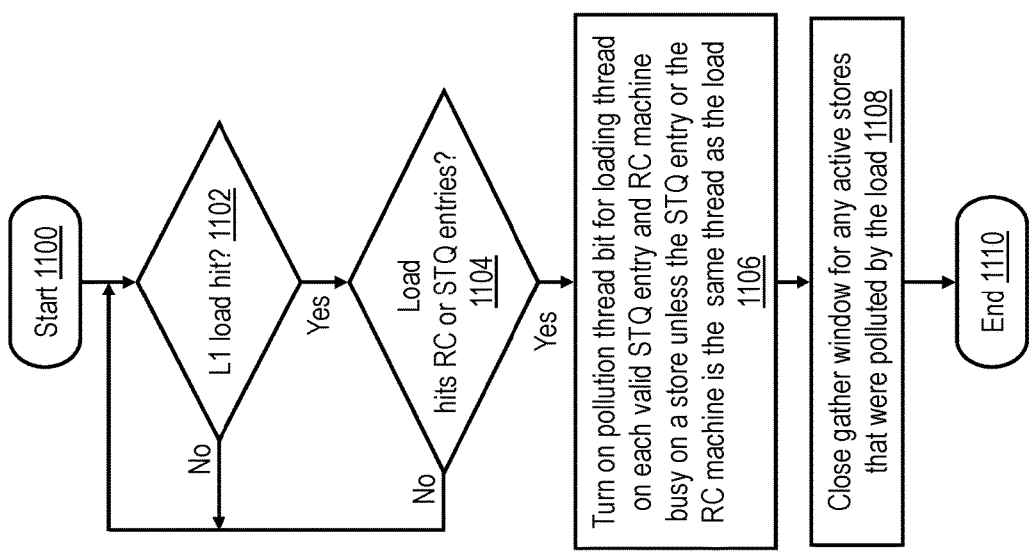
FIG. 11 is a flowchart of an exemplary process for setting a bit of a pollution vector of a store for a thread whose load hits in an L1 cache and hits an STQ entry or an RC machine according to the present disclosure.

With reference to FIG. 11, a flowchart of an exemplary process for setting a bit of a pollution vector 1009 or 1009a for a thread whose load (LD) hits in L1 cache 105 and hits an address of an entry (in STQ 117) or an address in one of RC machines 421, according to the present disclosure, is illustrated. The process begins in block 1100 when a load instruction is executed by processor core 103, at which point control transfers to decision block 1102. In block 1102, pollution vector control 1007 (of L2 cache 107) determines, by reference to an 'L1 Hit' signal from L1 cache 105, whether an LD hit occurred in L1 cache 105. In response to an LD not hitting in L1 cache 105, control loops on block 1102. In response to an LD hit in L1 cache 105, control transfers from block 1102 to decision block 1104. In block 1104, pollution vector control 1007 determines whether an address of the LD hits in one of RC machines 421 or in STQ 117 by examining a result of the comparison, at comparators 1005 and 1013, of the target address of the LD (LD Address) with target addresses in address register 411 (of STQ 117) and target addresses (in address register 1015) in each of RC machines 421.

In response to the LD address not hitting in STQ 117 or one of RC machines 421 in block 1104, control transfers to block 1102. In response to the LD address hitting in STQ 117 or one of RC machines 421 in block 1104, control transfers to block 1106. In block 1106, pollution vector control 1007 turns on a pollution vector bit for the loading thread on each valid entry of STQ 117 and RC machine 421 that is busy on a store with a matching target address unless the entry of STQ 117 or RC machine 421 was issued by the same thread as the LD. Next, in block 1108, STQ controller 405 closes a gather window, by resetting gather bit 412, for any valid entries of STQ 117 whose address matches the LD address. Following block 1108, control transfers to block 1110 where the process terminates.

Figure 12:
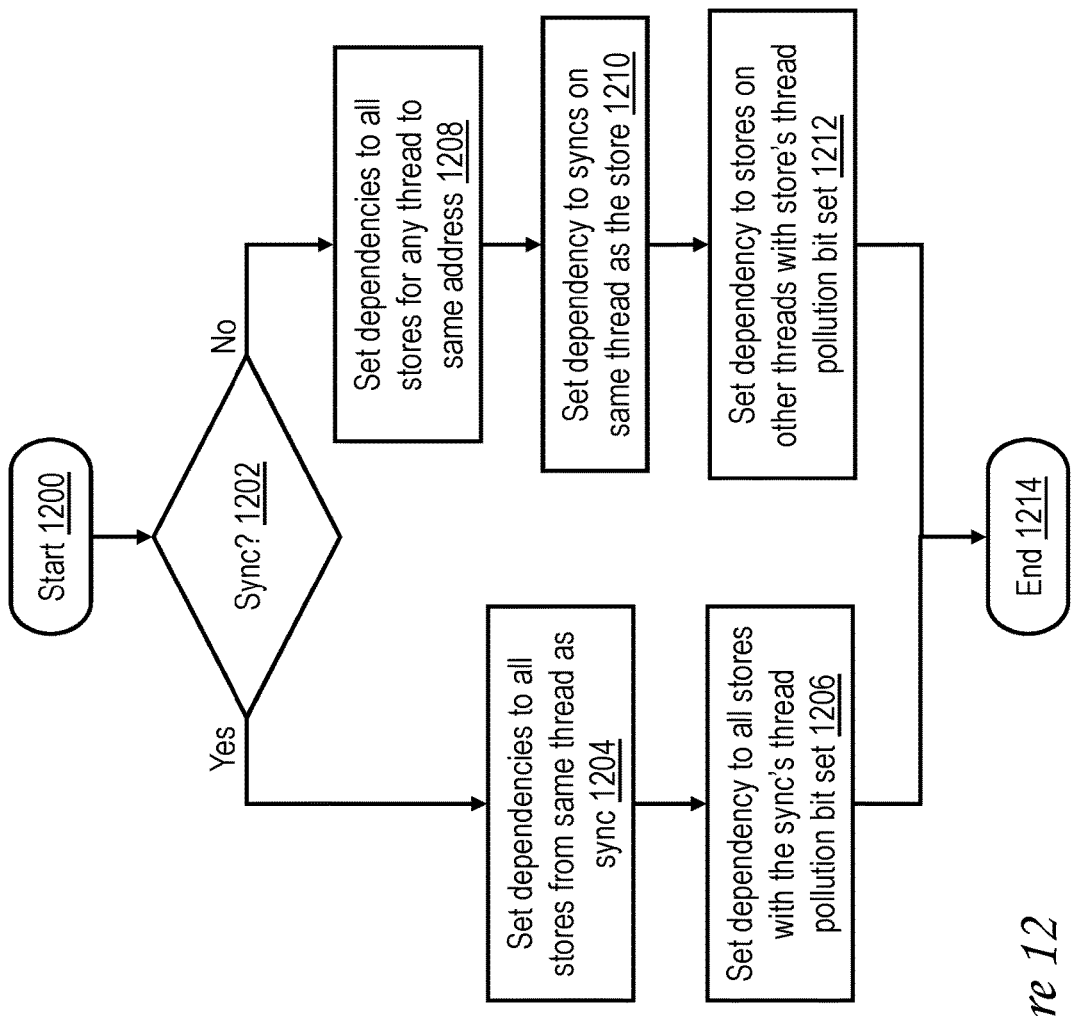
FIG. 12 is a flowchart of an exemplary process for setting a dependency vector according to the present disclosure.

With reference to FIG. 12, a flowchart of an exemplary process for setting a dependency vector in dependency matrix 408 for a store or SYNC operation entering STQ 117, according to the present disclosure, is illustrated. The process begins in block 1200 when a store or SYNC operation enters STQ 117, at which point control transfers to decision block 1202. In block 1202, STQ controller 405 (of L2 cache 107) determines whether a received operation is a store or a SYNC. In response to a determination at block 1202 that the received operation is not a SYNC but rather a store, control transfers to block 1208. In block 1208, STQ controller 405 sets, in STQ 117, dependencies in the received store's dependency vector to all threads' prior stores having a same target address as the received store. Next, in block 1210, STQ controller 405 sets dependencies in the received store's dependency vector to all prior SYNCs for the same thread as the received store. Then, in block 1212, STQ controller 405 sets dependencies in the received store's dependency vector to any other thread's prior store(s) in STQ 117 whose pollution vector bit for the received store's thread is set. Following block 1212, control transfers to block 1214 where the process terminates.

Returning to block 1202, in response to the received operation being a SYNC control transfers to block 1204. In block 1204, STQ controller 405 sets dependencies to all prior stores, in STQ 117, from the same thread as the SYNC. Next, in block 1206, STQ controller 405 sets dependencies to all prior stores in STQ 117 whose pollution vector bit for the received SYNC's thread is set. Following block 1206, control transfers to block 1214 where the process terminates.

Figure 13:
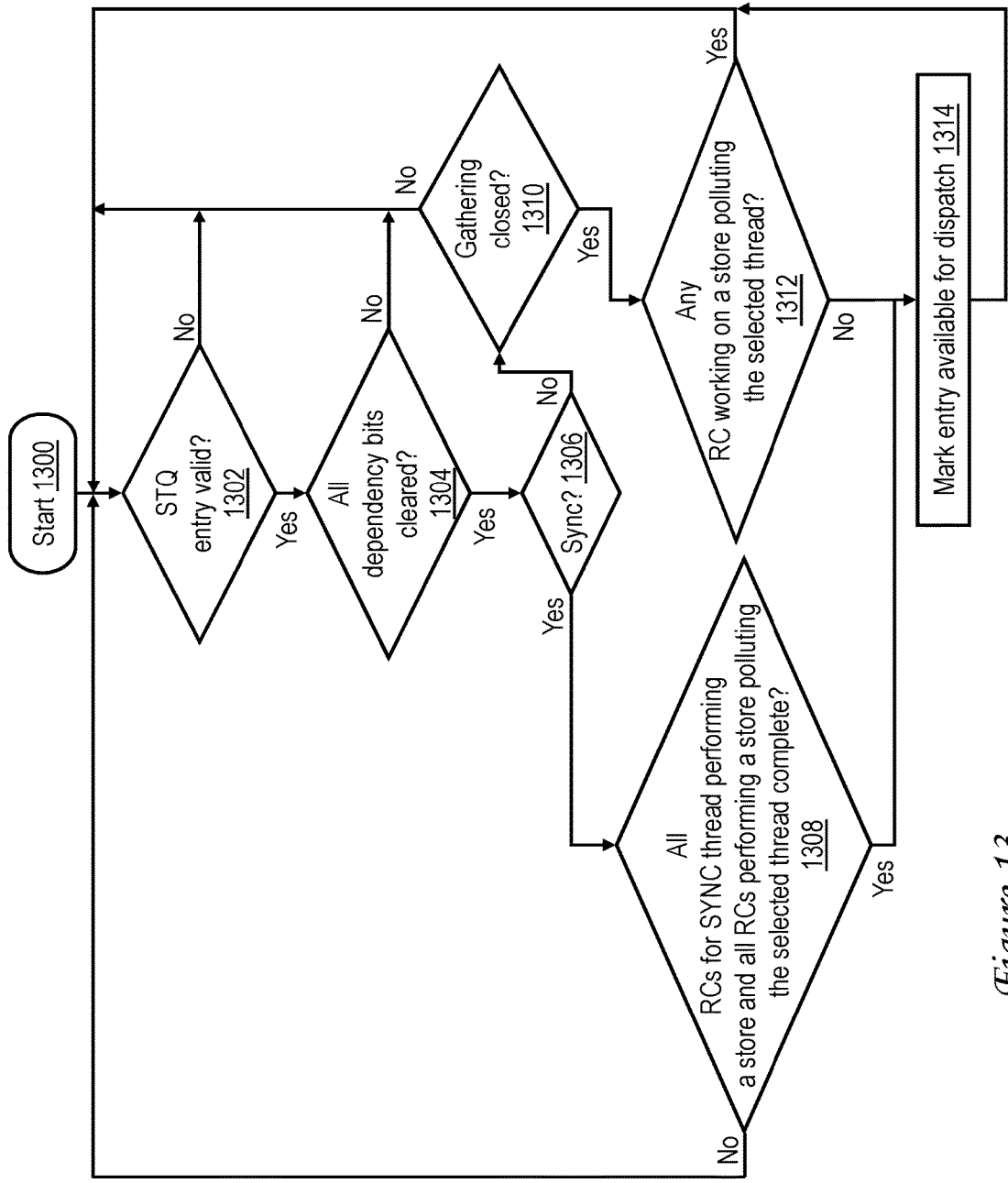
FIG. 13 is a flowchart of an exemplary process for marking an entry in the STQ of FIG. 4 available for dispatch to an RC machine according to the present disclosure.

With reference to FIG. 13, a flowchart of an exemplary process for marking an entry in STQ 117 (of FIG. 4) available for dispatch to an RC machine 421, according to the present disclosure, is illustrated. It should be appreciated that the process may execute in parallel for each entry in STQ 117. The process begins in block 1300, at which point control transfers to decision block 1302. In block 1302, STQ controller 405 (of L2 cache 107) determines whether an entry in STQ 117 is valid, e.g., by examining valid bit 417 for the entry. In response to an entry in STQ 117 not being valid in block 1302, control loops on block 1302. In response to an entry in STQ 117 being valid in block 1302, control transfers to decision block 1304. In block 1304, STQ controller 405 determines whether all dependency bits for the entry are cleared (indicating the entry is ready for dispatch). In response to all dependency bits for the entry not being cleared in block 1304, control transfers to decision block 1302. In response to all dependency bits for the entry being cleared in block 1304, control transfers to decision block 1306.

In block 1306, STQ controller 405 determines whether the entry holds a SYNC operation (e.g., by examining transaction type (ttype) field 414). In response to the operation for the entry being a SYNC, control transfers from block 1306 to decision block 1308. In block 1308, STQ controller 405 determines whether all RC machines 421 performing a store issued by the same thread as the SYNC and all RC machines 421 performing a store that pollutes the SYNC's thread (as indicated by the pollution vector 1009a bit for the SYNC's thread being set) have completed processing their respective stores. In response to a negative determination at block 1308, control transfers to block 1302. In response to a positive determination at block 1308, control transfers to block 1314. In block 1314, STQ controller 405 marks the entry (e.g., in an unillustrated control bit in control bits 415) available for dispatch to an RC machine 421. Following block 1314, the process returns to block 1302 and proceeds iteratively.

Returning to block 1306, in response to determining the entry does not hold a SYNC operation (i.e., the entry holds a store operation), control transfers from block 1306 to decision block 1310. In block 1310, STQ controller 405 determines whether gathering is closed for the entry (e.g., by examining gather bit 412 for the entry). In response to gathering not being closed for the entry in block 1310, control transfers to block 1302. In response to gathering being closed for the entry in block 1310, control transfers to decision block 1312. In block 1312, STQ controller 405 determines whether any RC machine 421 is working on a store polluting a selected thread (whether a bit of pollution vector 1009a is set for the store's thread). In the event any RC machine 421 is working on a store polluting the selected thread, control transfers from block 1312 to block 1302 (as the entry is not ready to dispatch). In the event no RC machine 421 is working on a store that pollutes the selected thread, control transfers from block 1312 to block 1314 which has been described.

Figure 14:
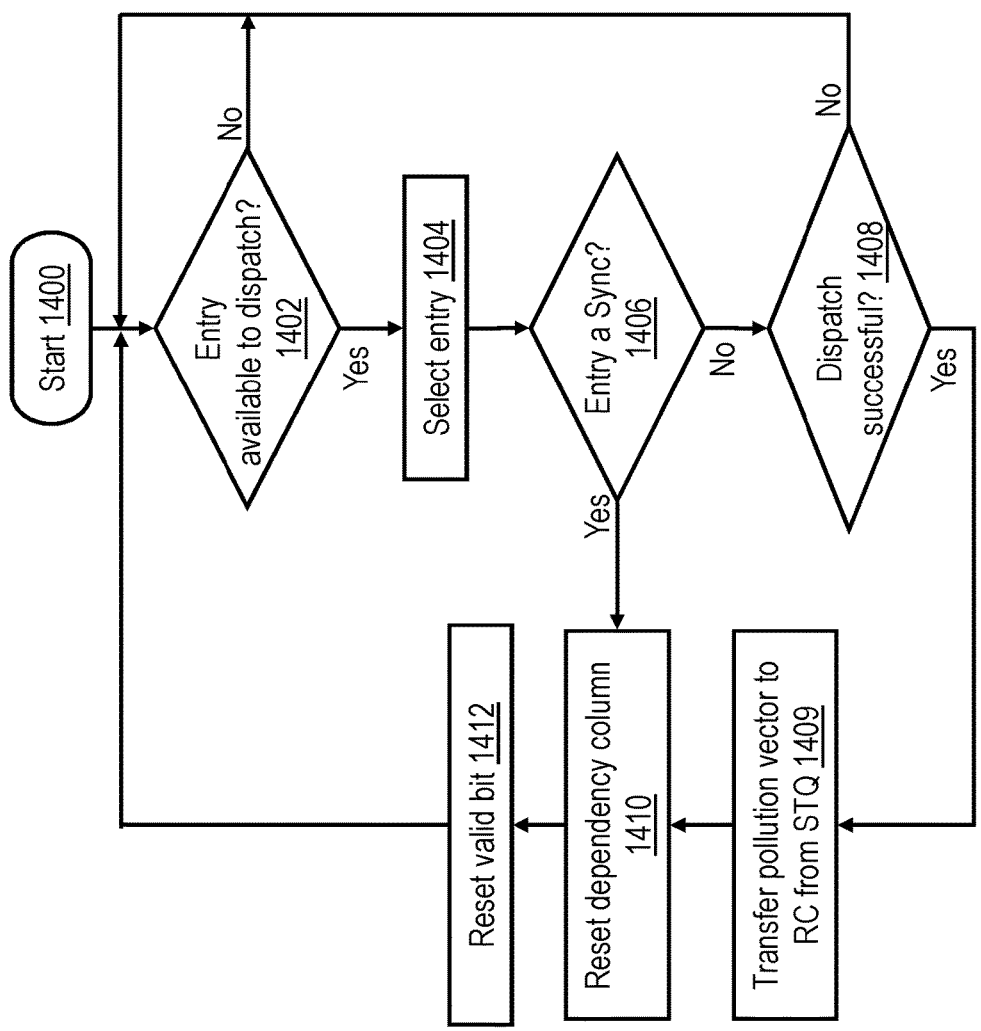
FIG. 14 is a flowchart of an exemplary process for resetting dependencies for dispatched entries in the STQ of FIG. 4 according to the present disclosure.

With reference to FIG. 14, a flowchart of an exemplary process for dispatching entries in STQ 117 to RC machines 421 and resetting associated entries in dependency matrix 408, according to the present disclosure, is illustrated. The process is initiated in block 1400, at which point control transfers to block 1402. In block 1402, STQ controller 405 determines whether an entry is available for dispatch to an RC machine 421. In response to an entry not being available for dispatch in block 1402, control loops on block 1402. In response to an entry being available for dispatch in block

1402, control transfers to block 1404 where STQ controller 405 selects an entry for dispatch.

Next, in decision block 1406, STQ controller 405 determines whether the selected entry contains a SYNC. In response to a determination at block 1406 that the selected entry holds a SYNC operation, control transfers to block 1410. In response to a determination at block 1406 that the selected entry does not hold a SYNC operation but rather holds a store operation, control transfers to block 1408 where STQ controller 405 determines whether the store was successfully dispatched to an RC machine 421. In response to the store not being successfully dispatched in block 1408, control transfers to block 1402. In response to the store being successfully dispatched in block 1408, control transfers to block 1409. In block 1409, STQ controller 405 transfers a pollution vector (from pollution vector block 1009) for the entry to an RC machine 421 (more specifically, to pollution vector block 1009*a*). Next, in block 1410, STQ controller 405 resets a dependency column in dependency matrix 408 corresponding to the dispatched entry to indicate the entries in STQ 117 formerly dependent on the just dispatched entry are no longer dependent on that entry. Then, in block 1412, STQ controller 405 resets valid bit 417 for the selected entry. From block 1412, control returns to block 1402.

Accordingly, techniques have been disclosed herein that implement barrier conditions in a manner that efficiently supports A-cumulativity and B-cumulativity in a weakly-ordered memory system.

The present invention may be a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A cache memory, comprising:
   a data array;
   a store queue configured to buffer synchronization operations and store operations;
   a pollution vector control that creates, within the store queue, respective pollution vectors to track which of multiple concurrent threads executed by an associated processor core are currently polluted by a store operation resident in the cache memory, wherein each pollution vector from among the respective pollution vectors has a width in bits that corresponds to a total number of threads that are executing on the associated processor core and a pollution vector bit corresponding to a specific thread is set within the pollution vector to indicate when the corresponding thread is polluted by the entry; and
   a store queue controller configured to set dependencies in a dependency data structure of the store queue based on the pollution vectors to reduce unnecessary ordering effects and dispatch store operations from the store queue in accordance with the dependencies indicated by the dependency data structure.

2. The cache memory of claim 1, wherein the cache memory is a lower level cache memory and the cache memory is further configured to:
   compare a load target address of a load operation that hits in an upper level cache memory that is associated with the lower level cache memory to active store target addresses in the lower level cache memory; and
   in response to a match of the load target address with one or more of the active store target addresses in the lower level cache memory, set an associated one of the respective pollution vectors to indicate that a thread that issued the load operation is polluted by a given store operation active in the lower level cache memory.

3. The cache memory of claim 1, wherein the cache memory is further configured to close a gathering window for a given thread whose pollution vector bit is set to prevent a subsequent store operation by the given thread from being gathered with an earlier unrelated store operation of the given thread.

4. The cache memory of claim 1, wherein the cache memory is further configured to:
   in response to receiving a synchronization operation for a specific thread, set bits for the synchronization operation in the dependency data structure to make the synchronization operation dependent on completion of all prior store operations of the specific thread in any entry of the store queue; and
   set the dependency data structure to make the synchronization operation dependent on any polluting store operations in any entry of the store queue.

5. The cache memory of claim 1, wherein the cache memory is further configured to, in response to receiving a store operation at the cache memory, set bits in the dependency data structure to make the store operation dependent on all prior store operations with a matching target address in any thread and all store operations from any other thread that pollutes a thread issuing the store operation.

6. The cache memory of claim 1, wherein the cache memory is further configured to, in response to all dependencies indicated by the dependency data structure for an entry in the store queue being reset and the entry corresponding to a given store operation, dispatch the given store operation to a read-claim machine of the cache memory for performance of an indicated memory update and update the dependency data structure to indicate the given store operation was dispatched.

7. The cache memory of claim 1, wherein each entry of the store queue is associated with a specific store resident, and wherein in creating the respective pollution vectors, the pollution vector control creates within each entry of the store queue, a pollution vector that is associated with a corresponding store operation resident and that tracks which of the multiple concurrent threads are currently polluted by the store operation resident.

8. A data processing system, comprising:
a processor core; and
a cache memory coupled to the processor core, wherein the cache memory includes:
  a data array;
  a store queue configured to buffer synchronization operations and store operations;
  a pollution vector control that creates, within the store queue, respective pollution vectors to track which of multiple concurrent threads executed by an associated processor core are currently polluted by a store operation resident in the cache memory, wherein each pollution vector from among the respective pollution vectors has a width in bits that corresponds to a total number of threads that are executing on the associated processor core and a pollution vector bit corresponding to a specific thread is set within the pollution vector to indicate when the corresponding thread is polluted by the entry; and
  a store queue controller configured to set dependencies in a dependency data structure of the store queue based on the pollution vectors to reduce unnecessary ordering effects and dispatch store operations from the store queue in accordance with the dependencies indicated by the dependency data structure.

9. The data processing system of claim 8, wherein the cache memory is a lower level cache memory and the cache memory is further configured to:
  compare a load target address of a load operation that hits in an upper level cache memory that is associated with the lower level cache memory to active store target addresses in the lower level cache memory; and
  in response to a match of the load target address with one or more of the active store target addresses in the lower level cache memory, set an associated one of the respective pollution vectors to indicate that a thread that issued the load operation is polluted by a given store operation active in the lower level cache memory.

10. The data processing system of claim 8, wherein the cache memory is further configured to close a gathering window for a given thread whose pollution vector bit is set to prevent a subsequent store operation by the given thread from being gathered with an earlier unrelated store operation of the given thread.

11. The data processing system of claim 8, wherein the cache memory is further configured to:
  in response to receiving a synchronization operation for a specific thread, set bits for the synchronization operation in the dependency data structure to make the synchronization operation dependent on completion of all prior store operations of the specific thread in any entry of the store queue; and
  set the dependency data structure to make the synchronization operation dependent on any polluting store operations in any entry of the store queue.

12. The data processing system of claim 8, wherein the cache memory is further configured to, in response to receiving a store operation at the cache memory, set bits in the dependency data structure to make the store operation dependent on all prior store operations with a matching target address in any thread and all store operations from any other thread that pollutes a thread issuing the store operation.

13. The data processing system of claim 8, wherein the cache memory is further configured to, in response to all dependencies indicated by the dependency data structure for an entry in the store queue being reset and the entry corresponding to a given store operation, dispatch the given store operation to a read-claim machine of the cache memory for performance of an indicated memory update and update the dependency data structure to indicate the given store operation was dispatched.

14. The data processing system of claim 8, wherein each entry of the store queue is associated with a specific store resident, and wherein in creating the respective pollution vectors, the pollution vector control creates within each entry of the store queue, a pollution vector that is associated with a corresponding store operation resident and that tracks which of the multiple concurrent threads are currently polluted by the store operation resident.

* * * * *